H. D. PATE.
GUANO DISTRIBUTER.
APPLICATION FILED JULY 19, 1912.

1,056,577.

Patented Mar. 18, 1913.

Witnesses
W. S. McDowell

Inventor
Henry D. Pate
By Victor J. Evans
Attorney

UNITED STATES PATENT OFFICE.

HENRY D. PATE, OF ABBOTT, TEXAS.

GUANO-DISTRIBUTER.

1,056,577.  Specification of Letters Patent.  Patented Mar. 18, 1913.

Application filed July 19, 1912. Serial No. 710,393.

*To all whom it may concern:*

Be it known that I, HENRY D. PATE, a citizen of the United States, residing at Abbott, in the county of Hill and State of Texas, have invented new and useful Improvements in Guano-Distributers, of which the following is a specification.

This invention relates to fertilizer or guano distributers and the principal object of the invention is to provide a simple and efficient machine whereby a predetermined quantity of fertilizer or guano may be distributed over a given area or territory.

A further object of the invention is to provide a supporting foot or member which will be automatically thrown to inoperative position when the distributer is moved forwardly.

Further objects of this invention will appear as the following specific description is read in connection with the accompanying drawing, which forms a part of this application, and in which:—

Figure 1:
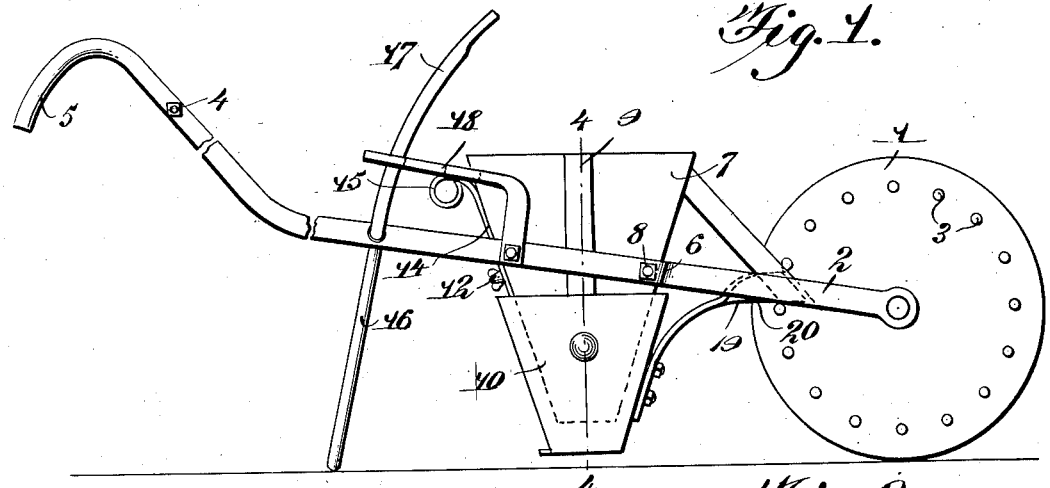
Figure 2:
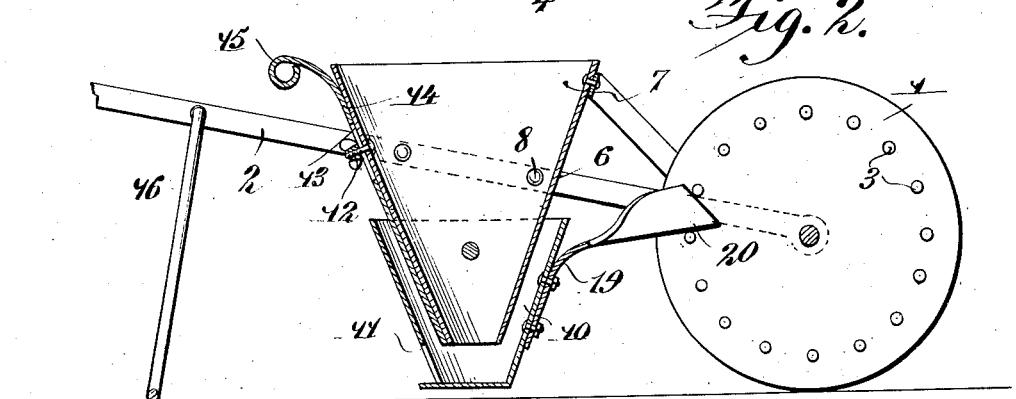
Figure 3:
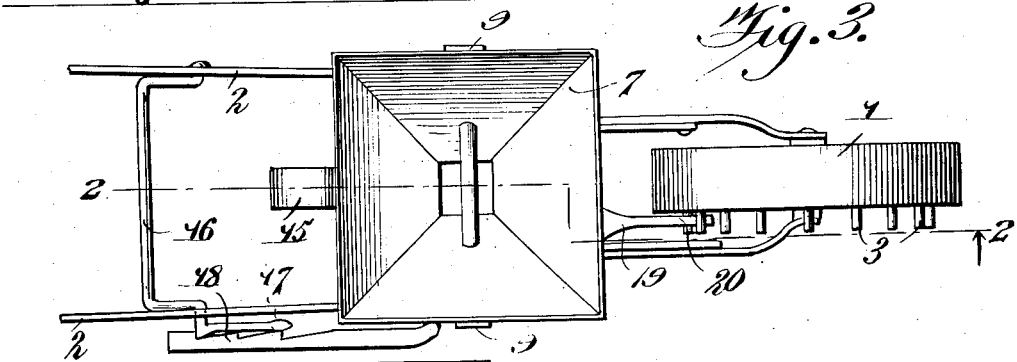
Figure 4:
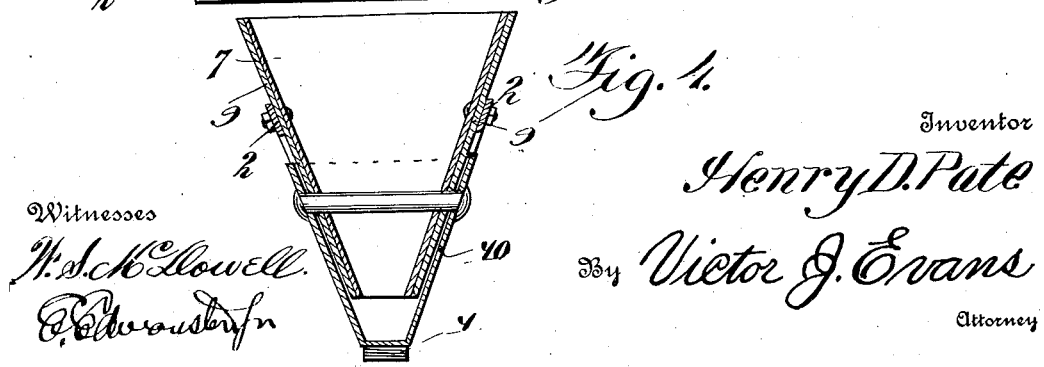

Figure 1 is a side elevation. Fig. 2 is a vertical longitudinal sectional view on the line 2—2 of Fig. 3. Fig. 3 is a top plan view. Fig. 4 is a transverse section on the line 4—4 of Fig. 1.

Referring more particularly to the drawing, 1 represents the supporting wheel which is journaled in the side bars 2, as shown, and is provided with an annular series of projecting pins 3 to be hereinafter more fully described. The side bars extend rearwardly from the wheel and are connected together by a brace rod 4 and in the rear of the base are curved downwardly in the form of handles 5. The side bars extend rearwardly on parallel lines for a predetermined distance and then are offset to produce a shoulder 6 against which the front wall of the hopper 7 abuts. This hopper is arranged between and supported upon the side bars by means of the bolts 8. The bottom of the hopper is open, as shown, and extending down the sides are reinforcing strips 9 to which are pivoted the auxiliary hopper or gate 10 having one side provided with an opening 11 and through which the fertilizer is adapted to pass. Passing through the rear wall of the hopper is a bolt or adjusting screw 12 which engages a slot 13 formed in the valve plate 14 which is slidably mounted over the rear wall so as to regulate the amount of fertilizer flowing out of the opening 11. The upper end of this valve slide is provided with a handle 15 by which the same may be manipulated.

Pivotally mounted between the side bars 2 is a yoke-shaped supporting standard 16, one leg of which passes through one of the side bars and extends vertically in the form of an operating lever 17. This operating lever works over a rack 18 which is carried by the side bar and whose teeth are arranged rearwardly so that when the foot is resting upon the ground and the distributer moved forwardly, the lever will spring out of engagement with each tooth by reason of the lower end of the yoke member being stationary with the ground. The shaft or bolt upon which the auxiliary hopper 10 is pivoted, passes entirely through the main hopper so as to act as an agitator.

The hopper has secured thereto an operating arm 19 having a beveled end 20. This operating arm engages the teeth and rides over the same when the distributer is moved forwardly so as to reciprocate the auxiliary hopper and cause the same to shake the fertilizer resting upon the bottom thereof out of the opening 11 in accordance with the position of the valve 14. Any attempt to move the distributer in a rearward direction will cause the pin which has just passed over the arm to engage the beveled end 20 and lock the wheel against rearward motion.

What is claimed is:—

The combination with a fertilizer distributer comprising in part a supporting wheel, side bars and a hopper carried by said side bars, of a yoke-shaped supporting foot pivoted to the side bars and having one of its legs extended in the form of a lever, and a rack bar or arm connected to the side bar and having rearwardly raking teeth adapted to engage said lever for holding the supporting foot in adjusted position.

In testimony whereof I affix my signature in presence of two witnesses.

HENRY D. PATE.

Witnesses:
J. Q. ADAMS,
A. F. ADAMS.